(12) United States Patent
Bailey et al.

(10) Patent No.: US 7,673,526 B2
(45) Date of Patent: Mar. 9, 2010

(54) APPARATUS AND METHOD OF LENSING AN ULTRASONIC BEAM FOR AN ULTRASONIC FLOW METER

(75) Inventors: Timothy J. Bailey, Longmeadow, MA (US); Mark Fernald, Enfield, CT (US); Changjiu Dang, Wallingford, CT (US); Christian O'Keefe, Durham, CT (US)

(73) Assignee: Expro Meters, Inc., Wallingford, CT (US)

( * ) Notice: Subject to any disclaimer, the term of this patent is extended or adjusted under 35 U.S.C. 154(b) by 34 days.

(21) Appl. No.: 11/931,214

(22) Filed: Oct. 31, 2007

(65) Prior Publication Data

US 2008/0098824 A1 May 1, 2008

Related U.S. Application Data

(60) Provisional application No. 60/856,244, filed on Nov. 1, 2006.

(51) Int. Cl.
*G01F 1/66* (2006.01)
(52) U.S. Cl. .................. 73/861.27; 73/861.26
(58) Field of Classification Search .............. None
See application file for complete search history.

(56) References Cited

U.S. PATENT DOCUMENTS

| | | | |
|---|---|---|---|
| 2,874,568 A | 2/1959 | Petermann | |
| 2,949,772 A * | 8/1960 | Kritz | 73/861.27 |
| 3,715,709 A | 2/1973 | Zacharias et al. | |
| 3,751,979 A | 8/1973 | Ims | |
| 3,781,895 A | 12/1973 | Monser | |
| 3,782,193 A * | 1/1974 | Meyer et al. | 73/861.27 |
| 3,851,521 A | 12/1974 | Ottenstein | |
| 3,885,432 A | 5/1975 | Herzl | |
| 3,952,578 A | 4/1976 | Jacobs | |
| 4,004,461 A | 1/1977 | Lynnworth | |
| 4,032,259 A | 6/1977 | Brown | |
| 4,048,853 A | 9/1977 | Smith et al. | |

(Continued)

FOREIGN PATENT DOCUMENTS

DE 4306119 9/1994

(Continued)

OTHER PUBLICATIONS

Piezo Film Sensors Technical Manual—Provided by Measurement Specialties, Inc.

(Continued)

*Primary Examiner*—Harshad Patel (57) ABSTRACT

A method for sensing flow within a pipe having an internal passage disposed between a first wall portion and a second wall portion is provided, comprising the steps of: 1) providing a flow meter having at least one ultrasonic sensor unit that includes an ultrasonic transmitter attached to the first wall portion and an ultrasonic receiver attached to the second wall portion and aligned to receive ultrasonic signals transmitted from the transmitter; 2) selectively operating the ultrasonic transmitter to transmit a beam of ultrasonic signal, which beam has a focal point such that within the pipe, the beam is either colliminated, divergent or convergent; and 3) receiving the ultrasonic signals within the beam using the ultrasonic receiver. An apparatus operable to perform the aforesaid method is also provided.

13 Claims, 7 Drawing Sheets

U.S. PATENT DOCUMENTS

| | | | |
|---|---|---|---|
| 4,080,837 A | 3/1978 | Alexander et al. | |
| 4,195,517 A | 4/1980 | Kalinoski et al. | |
| 4,248,085 A | 2/1981 | Coulthard | |
| 4,320,659 A | 3/1982 | Lynnworth et al. | |
| 4,445,389 A | 5/1984 | Potzick et al. | |
| 4,520,320 A | 5/1985 | Potzick et al. | |
| 4,561,310 A | 12/1985 | Barnard et al. | |
| 4,677,305 A | 6/1987 | Ellinger | |
| 4,717,159 A | 1/1988 | Alston et al. | |
| 4,852,575 A * | 8/1989 | Nikoonahad | 73/861.27 |
| 4,896,540 A | 1/1990 | Shakkottai et al. | |
| 4,932,262 A | 6/1990 | Wlodarczyk | |
| 5,040,415 A | 8/1991 | Barkhoudarian | |
| 5,060,506 A | 10/1991 | Douglas | |
| 5,083,452 A | 1/1992 | Hope | |
| 5,218,197 A | 6/1993 | Carroll | |
| 5,285,675 A | 2/1994 | Colgate et al. | |
| 5,289,726 A | 3/1994 | Miau et al. | |
| 5,359,897 A | 11/1994 | Hamstead et al. | |
| 5,363,342 A | 11/1994 | Layton et al. | |
| 5,367,911 A | 11/1994 | Jewell et al. | |
| 5,372,047 A * | 12/1994 | Russwurm et al. | 73/861.29 |
| 5,398,542 A | 3/1995 | Vasbinder | |
| 5,437,194 A * | 8/1995 | Lynnworth | 73/861.27 |
| 5,440,937 A * | 8/1995 | Lynnworth et al. | 73/861.29 |
| 5,524,475 A | 6/1996 | Kolpak et al. | |
| 5,526,844 A | 6/1996 | Kamen et al. | |
| 5,591,922 A | 1/1997 | Segeral et al. | |
| 5,625,140 A | 4/1997 | Cadet et al. | |
| 5,708,211 A | 1/1998 | Jepson et al. | |
| 5,741,980 A | 4/1998 | Hill et al. | |
| 5,770,805 A | 6/1998 | Castel | |
| 5,770,806 A | 6/1998 | Hiismaki | |
| 5,835,884 A | 11/1998 | Brown | |
| 5,845,033 A | 12/1998 | Berthold et al. | |
| 5,856,622 A | 1/1999 | Yamamoto et al. | |
| 5,948,959 A | 9/1999 | Peloquin | |
| 5,962,790 A * | 10/1999 | Lynnworth et al. | 73/861.18 |
| 6,016,702 A | 1/2000 | Maron | |
| 6,151,958 A | 11/2000 | Letton et al. | |
| 6,202,494 B1 | 3/2001 | Ricbel et al. | |
| 6,233,374 B1 | 5/2001 | Ogle et al. | |
| 6,261,232 B1 | 7/2001 | Yokosawa et al. | |
| 6,345,539 B1 | 2/2002 | Rawes et al. | |
| 6,349,599 B1 | 2/2002 | Lynnworth et al. | |
| 6,354,147 B1 | 3/2002 | Gysling et al. | |
| 6,378,357 B1 | 4/2002 | Han et al. | |
| 6,397,683 B1 | 6/2002 | Hagenmeyer | |
| 6,412,353 B1 | 7/2002 | Kleven et al. | |
| 6,435,030 B1 | 8/2002 | Gysling et al. | |
| 6,442,996 B1 | 9/2002 | Thurston et al. | |
| 6,443,226 B1 | 9/2002 | Diener et al. | |
| 6,450,037 B1 | 9/2002 | McGuinn et al. | |
| 6,463,813 B1 | 10/2002 | Gysling | |
| 6,481,268 B1 * | 11/2002 | Povey et al. | 73/61.75 |
| 6,532,827 B1 | 3/2003 | Ohnishi | |
| 6,536,291 B1 | 3/2003 | Gysling et al. | |
| 6,550,342 B2 | 4/2003 | Croteau et al. | |
| 6,558,036 B2 | 5/2003 | Gysling et al. | |
| 6,587,798 B2 | 7/2003 | Kersey et al. | |
| 6,601,005 B1 | 7/2003 | Eryurek et al. | |
| 6,601,458 B1 | 8/2003 | Gysling et al. | |
| 6,609,069 B2 | 8/2003 | Gysling | |
| 6,626,049 B1 * | 9/2003 | Ao | 73/861.29 |
| 6,658,945 B1 | 12/2003 | Kleven | |
| 6,672,163 B2 | 1/2004 | Han et al. | |
| 6,691,584 B2 | 2/2004 | Gysling et al. | |
| 6,698,277 B2 * | 3/2004 | Povey et al. | 73/61.75 |
| 6,698,297 B2 | 3/2004 | Gysling | |
| 6,732,575 B2 | 5/2004 | Gysling et al. | |
| 6,773,603 B2 | 8/2004 | Moorehead et al. | |
| 6,782,150 B2 | 8/2004 | Davis et al. | |
| 6,796,195 B2 * | 9/2004 | Povey et al. | 73/865.5 |
| 6,813,962 B2 | 11/2004 | Gysling et al. | |
| 6,837,098 B2 | 1/2005 | Gysling et al. | |
| 6,837,332 B1 | 1/2005 | Rodney | |
| 6,862,920 B2 | 3/2005 | Gysling et al. | |
| 6,889,562 B2 | 5/2005 | Gysling et al. | |
| 6,898,541 B2 | 5/2005 | Gysling et al. | |
| 6,971,259 B2 | 12/2005 | Gysling | |
| 6,988,411 B2 | 1/2006 | Gysling et al. | |
| 7,032,432 B2 | 4/2006 | Gysling et al. | |
| 7,469,599 B2 * | 12/2008 | Froehlich et al. | 73/861.27 |
| 2002/0123852 A1 | 9/2002 | Gysling et al. | |
| 2002/0129662 A1 | 9/2002 | Gysling et al. | |
| 2003/0038231 A1 | 2/2003 | Bryant et al. | |
| 2003/0089161 A1 | 5/2003 | Gysling | |
| 2003/0136186 A1 | 7/2003 | Gysling et al. | |
| 2003/0154036 A1 | 8/2003 | Gysling et al. | |
| 2004/0006409 A1 | 1/2004 | Liljenberg et al. | |
| 2004/0011141 A1 | 1/2004 | Lynnworth | |
| 2004/0016284 A1 | 1/2004 | Gysling et al. | |
| 2004/0069069 A1 | 4/2004 | Gysling et al. | |
| 2004/0074312 A1 | 4/2004 | Gysling | |
| 2004/0144182 A1 | 7/2004 | Gysling et al. | |
| 2004/0167735 A1 | 8/2004 | Rothman et al. | |
| 2004/0168522 A1 | 9/2004 | Fernald et al. | |
| 2004/0168523 A1 | 9/2004 | Fernald et al. | |
| 2004/0194539 A1 | 10/2004 | Gysling | |
| 2004/0199340 A1 | 10/2004 | Kersey et al. | |
| 2004/0199341 A1 | 10/2004 | Gysling et al. | |
| 2004/0210404 A1 | 10/2004 | Gysling et al. | |
| 2004/0226386 A1 | 11/2004 | Gysling et al. | |
| 2004/0231431 A1 | 11/2004 | Sullivan et al. | |
| 2004/0255695 A1 | 12/2004 | Gysling et al. | |
| 2005/0000289 A1 | 1/2005 | Gysling et al. | |
| 2005/0005711 A1 | 1/2005 | Gysling et al. | |
| 2005/0005712 A1 | 1/2005 | Gysling et al. | |
| 2005/0005713 A1 | 1/2005 | Winston et al. | |
| 2005/0011258 A1 | 1/2005 | Gysling et al. | |
| 2005/0011283 A1 | 1/2005 | Gysling et al. | |
| 2005/0011284 A1 | 1/2005 | Gysling et al. | |
| 2005/0012935 A1 | 1/2005 | Kersey | |
| 2005/0033545 A1 | 2/2005 | Gysling | |
| 2005/0039520 A1 | 2/2005 | Davis et al. | |
| 2005/0044929 A1 | 3/2005 | Gysling et al. | |
| 2005/0044966 A1 | 3/2005 | Gysling et al. | |
| 2005/0050956 A1 | 3/2005 | Gysling et al. | |
| 2005/0061060 A1 | 3/2005 | Gysling et al. | |
| 2005/0072216 A1 | 4/2005 | Engel | |
| 2005/0125166 A1 | 6/2005 | Loose et al. | |
| 2005/0125170 A1 | 6/2005 | Gysling et al. | |
| 2005/0139013 A1 * | 6/2005 | Hashimoto et al. | 73/861.27 |
| 2005/0171710 A1 | 8/2005 | Gysling et al. | |

FOREIGN PATENT DOCUMENTS

| | | |
|---|---|---|
| EP | 0290336 | 11/1998 |
| EP | 1186868 | 3/2002 |
| GB | 2210169 | 6/1989 |
| WO | WO 9314382 | 7/1993 |
| WO | WO 9967629 | 12/1999 |
| WO | WO 00/46583 | 8/2000 |
| WO | WO 02/50511 | 6/2002 |
| WO | WO 2004/063741 | 7/2004 |

OTHER PUBLICATIONS

Sonar-Based Volumetric Flow Meter For Pulp and Paper Applications—Daniel L. Gysling & Douglas H. Loose—Dec. 13, 2003.

Sonar-Based Volumetric Flow Meter for Chemical and Petrochemical Applications—Daniel L. Gysling & Douglas H. Loose—Feb. 14, 2003.

New Flowmeter Principle—By Walt Boyes—Flow Control Magazine—Oct. 2003 Issue.

SONAR Gets into the Flow—Daniel L. Gysling and Douglas H. Loose—Modern Process—Jan. 2004.

"Noise and Vibration Control Engineering Principles and Applications", Leo L. Beranek and Istvan L. Ver, A. Wiley Interscience Publication, pp. 537-541, Aug. 1992.

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag.

"Viscous Attenuation of Acoustic Waves in Suspensions" by R.L. Gibson, Jr. and M.N. Toksoz.

http://en.wikipedia.org/wiki//Convection, p. 1-5.

www.m-w.com/dictionary/acoustic.

Harshal B. Nemade, IEEE Transactions on Instrumentation and Measurement, vol. 47, No. 1, Feb. 1998, p. 265-269.

D.O. Thompson and D.E. Chimenti, Non-Intrusive, Ultrasonic Measurement of Fluid Composition, 1998 Abstract.

* cited by examiner

APPARATUS AND METHOD OF LENSING AN ULTRASONIC BEAM FOR AN ULTRASONIC FLOW METER

Applicant hereby claims priority benefits under 35 U.S.C. § 119(e) of U.S. Provisional Patent Application No. 60/856,244 filed Nov. 1, 2006, the disclosure of which is herein incorporated by reference.

CROSS-REFERENCE TO RELATED PATENT APPLICATIONS

The present application relates to U.S. Patent Application No. 60/856,243 filed on Nov. 1, 2006, U.S. patent application Ser. No. 10/756,977, filed Jan. 13, 2004 and U.S. Provisional Patent Application No. 60/833,651, filed Jul. 27, 2006, which are incorporated by reference herein in their entirety.

BACKGROUND OF THE INVENTION

1. Technical Field

This invention relates to methods and apparatus for improving the signal-to-noise ratio of ultrasonic sensors utilized for sensing fluid flow within a pipe in general, and to methods and apparatus for lensing an ultrasonic beam or signal to optimize the signal properties of the transmitted ultrasonic beam passing through a fluid flow having entrained particles or bubbles.

2. Background Information

Multiphase fluid flows pose certain issues for flow meters utilizing ultrasonic sensors. In addition to other factors, such as absorption and reflections, particles and/or bubbles entrained within a fluid flow will attenuate an ultrasonic signal or beam propagating through the fluid. The attenuation of the signal may result in a low signal-to-noise ratio, which in turn can make it more difficult to accurately detect and measure the transmitted ultrasonic signal.

For those ultrasonic flow meters that utilize transmitter/receiver sensor units disposed outside the flow pipe the signal-to-noise ratio of the device can also be negatively affected by undesirable "secondary" signals that are portions of the original signal that have been refracted or reflected along a different path through the pipe instead of through the fluid flow. These secondary signals often possess sufficient strength to reach the receiver transducer of the sensor unit, and may interfere with the desired signal passing through the fluid flow. Examples of undesirable secondary signals include "ring-around" signals that travel through the pipe wall.

Figure 12:
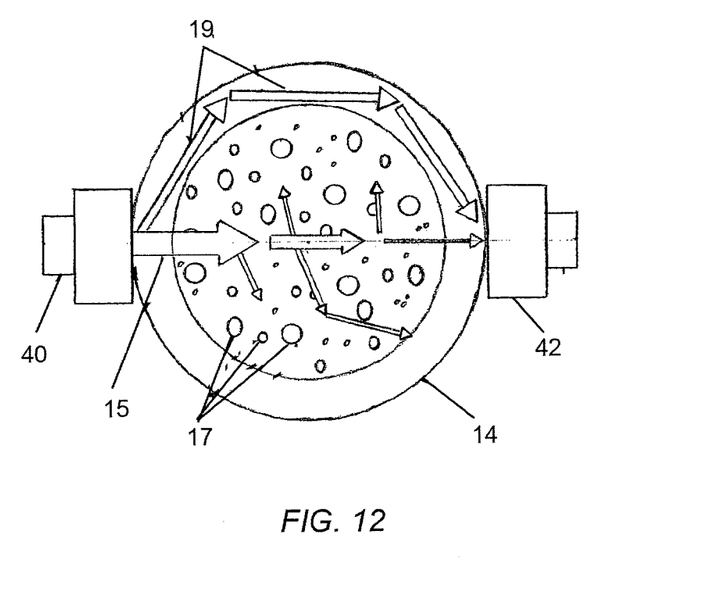
FIG. 12 is a diagrammatic depiction of a sensing unit within a flow meter, having a transmitter and a receiver diagonally disposed from one another, illustrating ultrasonic signal paths.

FIG. 12 diagrammatically illustrates an ultrasonic sensor arrangement where ring-around signals and through-transmitted signals are generated in a sensor unit having an ultrasonic transmitting sensor 40 and the ultrasonic receiving sensor 42 of a sensing unit attached to the exterior surface of a pipe 14. The sensors 40, 42 are arranged such that the generated ultrasonic signal 15 is injected normal to the pipe 14 (and the flow path through the pipe), with the intent to have the injected signal travel through the center of the fluid within the pipe 14. As the ultrasonic signal 15 bisects the pipe 14, bubbles 17 and other matter within the pipe 14 will scatter and attenuate the signal before it fully traverses the pipe 14 and is detected by the receiving transducer 42. At the same time, ring-around signals 19, created through reflection and diffraction between the ultrasonic transmitter and the wall, travel within the pipe wall and are sensed by the receiver 42 along with any desired signals. The noise created by the secondary signals (e.g., ring-around signals) coupled with the significant attenuation of the through-transmitted signal, creates an undesirable signal-to-noise ratio that makes it difficult to accurately detect and measure the desired through-transmitted ultrasonic signal.

What is needed is a method and apparatus operable to optimize the signal properties of an ultrasonic signal to improve the detection of the ultrasonic signal under various flow conditions related to particles and bubbles entrained within the fluid flow, and one which thereby diminishes the effects of undesirable noise resulting from secondary signals.

SUMMARY OF THE INVENTION

It is, therefore, an object of the present invention to provide a method and apparatus operable to optimize the signal properties of an ultrasonic signal to improve the detection of the ultrasonic signal under various flow conditions related to particles and bubbles entrained within the fluid flow, which method and apparatus thereby diminishes the effects of undesirable noise resulting from secondary signals.

According to the present invention, an ultrasonic signal sensing apparatus for sensing flow within a cylindrical pipe having an internal passage is provided. The apparatus includes at least one ultrasonic signal transmitter attached to a first wall section of the pipe, at least one ultrasonic signal receiver attached to a second wall portion of the pipe, and a lens disposed between the first wall section of the pipe and the transmitter. The transmitter is operable to transmit ultrasonic signals into the pipe. The receiver is aligned with the transmitter to receive transmitted ultrasonic signals. The lens is disposed between the first wall section of the pipe and the transmitter, and aligned with the transmitter such that ultrasonic signals transmitted by the transmitter must pass through the lens prior to entering the internal passage of the pipe. The lens changes the focal point of a signal beam of the ultrasonic signal such that within the pipe, the signal beam is either colliminated, divergent or convergent to thereby optimize the signal properties of the transmitted ultrasonic signal to improve the detection of the ultrasonic signal by the ultrasonic signal receiver under various flow conditions related to particles and bubbles entrained within the fluid flow. The lens may be formed of a single material or multiple materials, each material having a selected speed of sound and shape to provide the desired focal point of the signal beam.

According to the invention, an ultrasonic sensing device for sensing flow within a pipe is provided. The apparatus includes at least one sensor mounted to the pipe and a lens. The sensor has a transmitter mounted on a first wall portion of the pipe for transmitting an ultrasonic signal into the pipe and a receiver mounted on a second wall portion of the pipe for receiving the transmitted ultrasonic signal. The lens is disposed between the transmitter and the first wall portion of the pipe. The lens is formed of one or more materials and is operable to shape the transmitted ultrasonic signals into a beam having a selected focal point such that the beam is either colliminated, divergent or convergent within the pipe.

According to the present invention, a method for sensing flow within a pipe having an internal passage disposed between a first wall portion and a second wall portion is provided, comprising the steps of: 1) providing a flow meter having at least one ultrasonic sensor unit that includes an ultrasonic transmitter attached to the first wall portion and an ultrasonic receiver attached to the second wall portion and aligned to receive ultrasonic signals transmitted from the transmitter; 2) selectively operating the ultrasonic transmitter to transmit a beam of ultrasonic signal, which beam has a focal point such that within the pipe, the beam is either colliminated, divergent or convergent; and 3) receiving the ultrasonic signals within the beam using the ultrasonic receiver.

According to the present invention, a method for sensing flow within a pipe having an internal passage disposed between a first wall portion and a second wall portion is provided, comprising the steps of: 1) providing a flow meter having at least one ultrasonic sensor unit that includes an ultrasonic transmitter attached to the first wall portion and an ultrasonic receiver attached to the second wall portion and aligned to receive ultrasonic signals transmitted from the transmitter; 2) selectively transmitting ultrasonic signals from the transmitter; 3) shaping the transmitted ultrasonic signals into a beam that is either colliminated, divergent or convergent within the pipe; and 4) receiving the ultrasonic signals within the beam using the ultrasonic receiver.

An advantage of the present invention method and apparatus is that a fluid flow having bubbles and/or particles entrained within the fluid flow can more accurately be sensed. Depending upon the specific flow conditions, the lens can be used to colliminate, diverge or converge the ultrasonic signal within the pipe to thereby optimize the signal characteristics of the ultrasonic signal at the receiver. For example, an ultrasonic signal beam that is colliminated within the fluid flow is less susceptible to being completely blocked by the bubbles and particles within the fluid flow. A narrow beam width associated with a convergence point makes the beam more susceptible to being completely blocked by bubbles or particles, but also provides very high power transmission of the ultrasonic signal and signal to noise at the receiver when the convergent beam is not blocked by a particle or bubble.

The foregoing and other objects, features and advantages of the present invention will become more apparent in light of the following detailed description of exemplary embodiments thereof.

BRIEF DESCRIPTION OF THE DRAWINGS

Referring now to the drawings wherein like items are numbered alike in the various Figures.

DETAILED DESCRIPTION OF THE INVENTION

The invention teaches methods to optimize the signal properties of a transmitted ultrasonic beam passing through a fluid flow having entrained particles or bubbles, the ultrasonic beam being provided by a clamp-on flow ultrasonic flow meter, similar to that described in U.S. patent application Ser. No. 10/756,977, filed Jan. 13, 2004, which is incorporated herein by reference.

Figure 1:
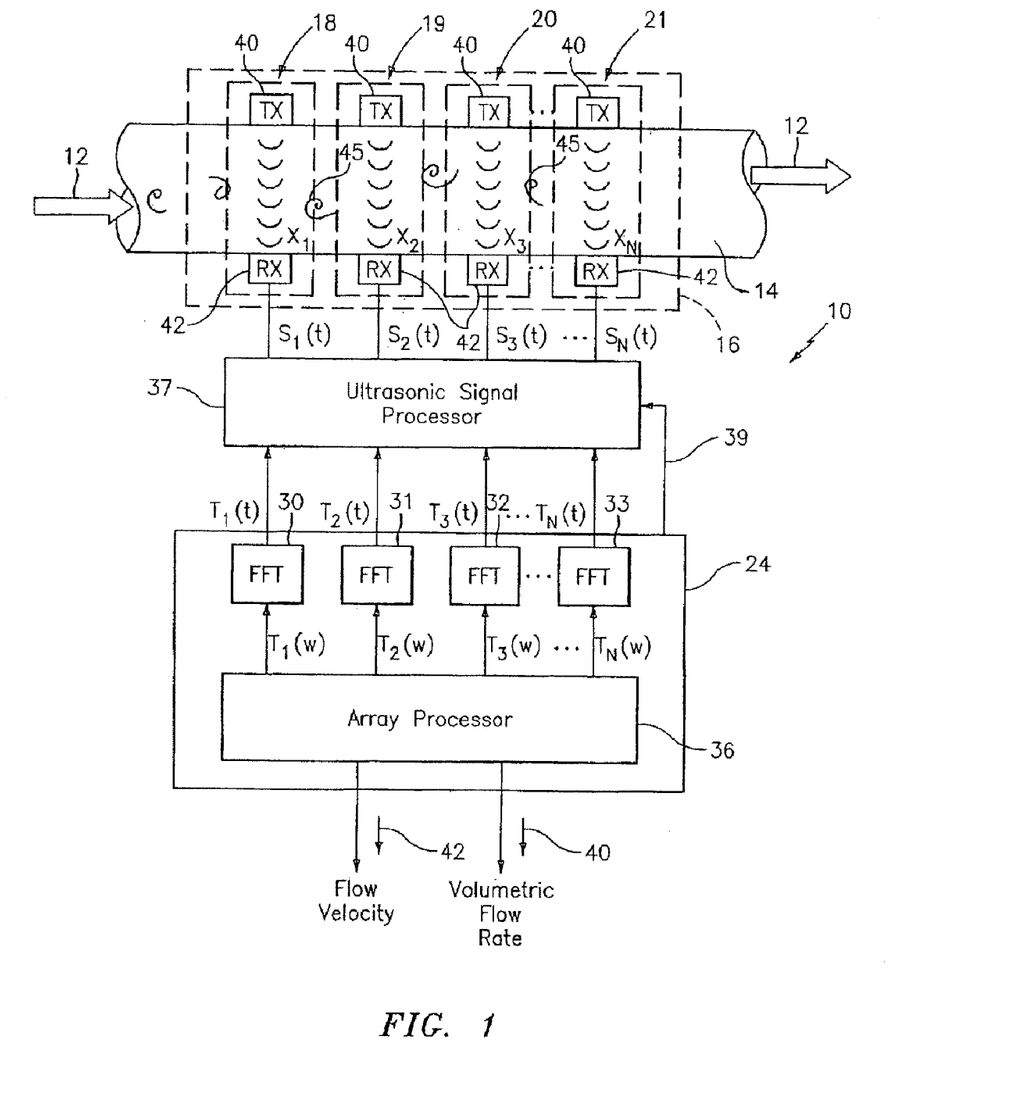
FIG. 1 is a block diagram of a flow meter having an array of ultrasonic sensor units disposed axially along a pipe for measuring the volumetric flow of the fluid flowing in the pipe, in accordance with the present invention.
Figure 2:
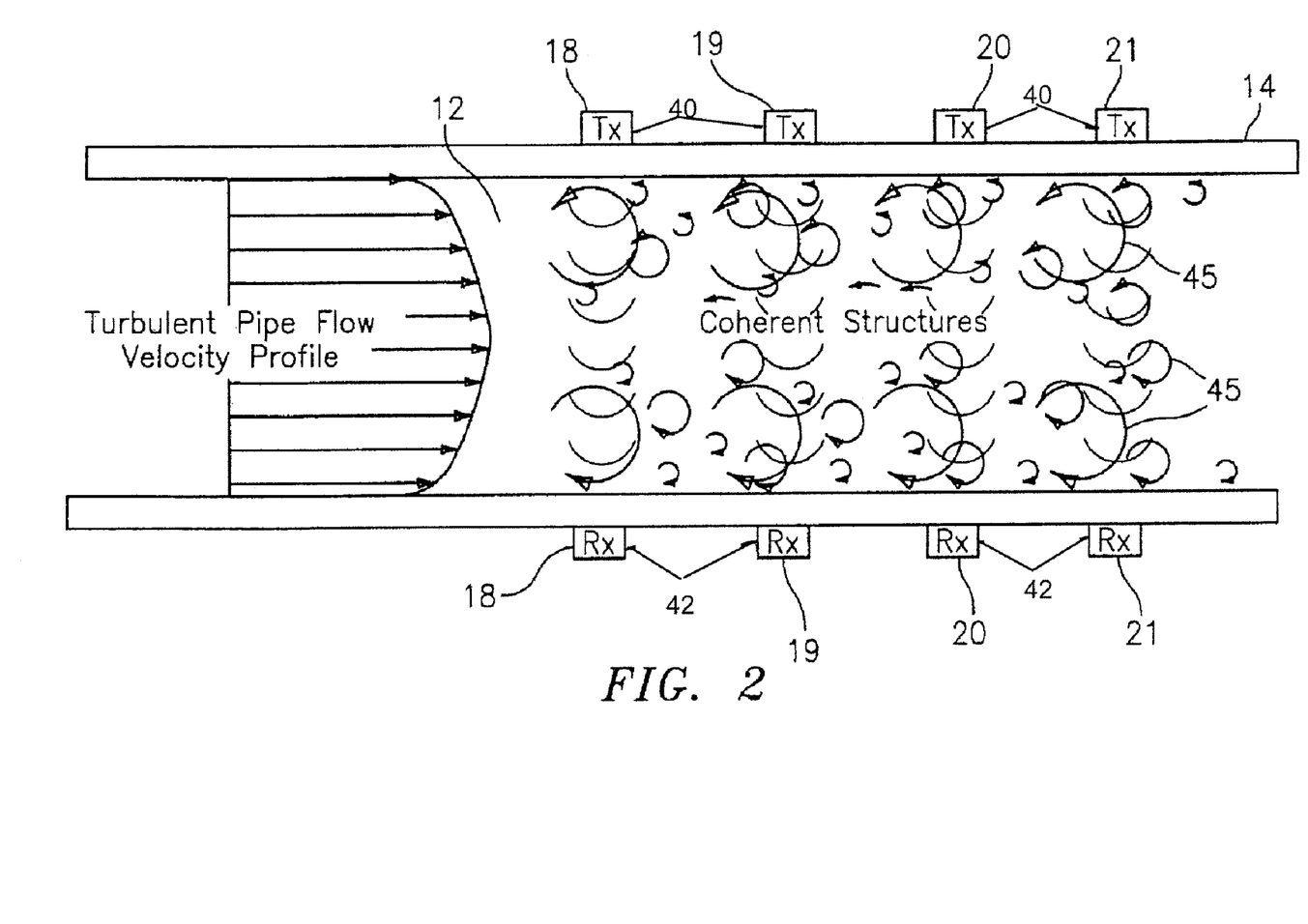
FIG. 2 is a cross-sectional view of a pipe having a turbulent pipe flowing having coherent structures therein, in accordance with the present invention.
Figure 3:
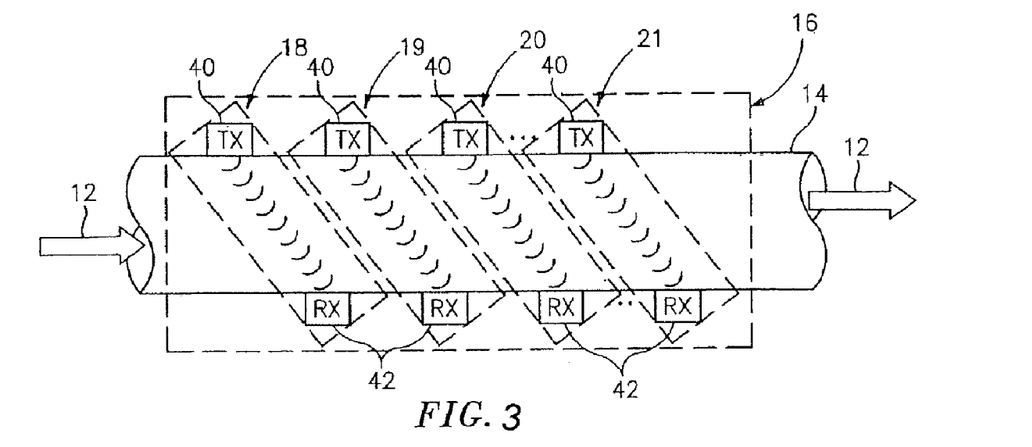
FIG. 3 is a block diagram of an alternative embodiment of a sensing device of a flow meter embodying the present invention similar to that shown in FIG. 1.
Figure 4:
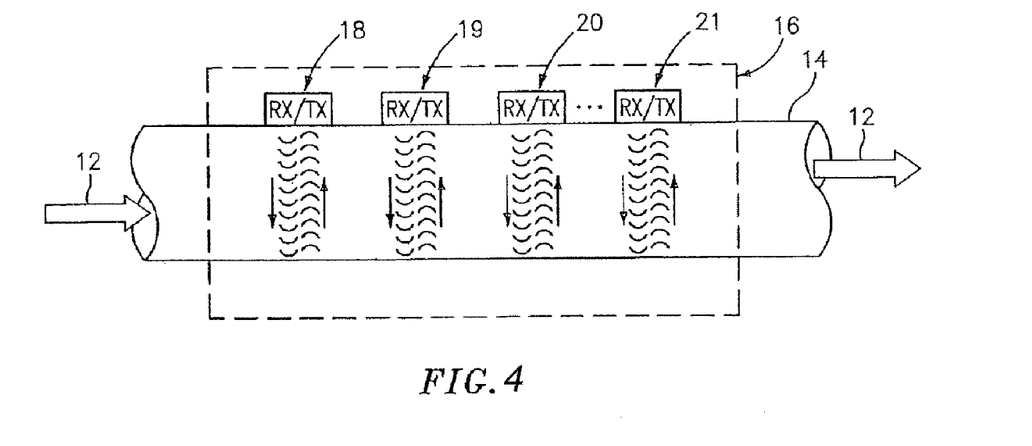
FIG. 4 is a block diagram of an alternative embodiment of a sensing device of a flow meter embodying the present invention similar to that shown in FIG. 1.
Figure 5:
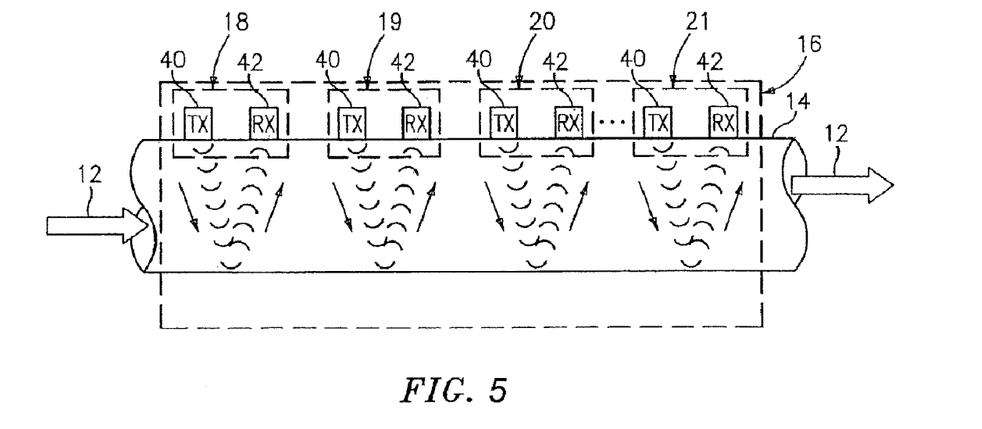
FIG. 5 is a block diagram of an alternative embodiment of a sensing device of a flow meter embodying the present invention similar to that shown in FIG. 1.
Figure 6:
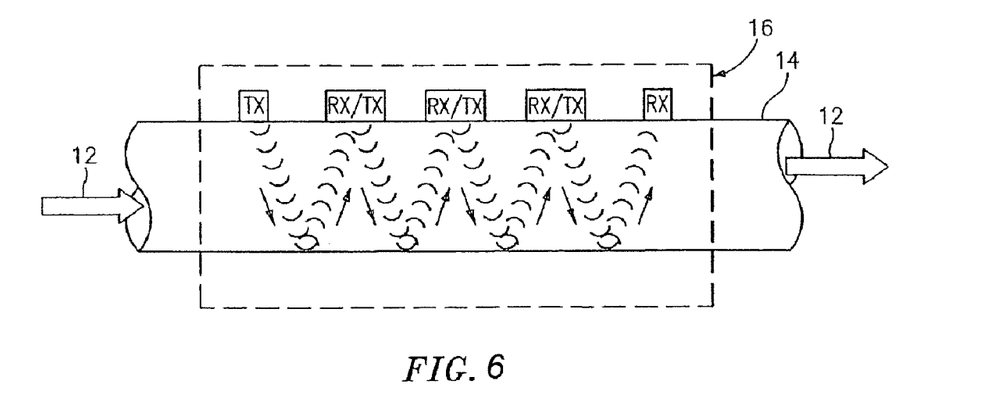
FIG. 6 is a block diagram of an alternative embodiment of a sensing device of a flow meter embodying the present invention similar to that shown in FIG. 1.

FIGS. 1 and 2 diagrammatically depict an ultrasonic clamp-on flow meter 10, an example of which is described in U.S. patent application Ser. No. 10/756,977. The ultrasonic flow meter 10 includes an array of ultrasonic sensors 16 having a plurality of ultrasonic sensor units 18-21 disposed axially along the length of the pipe 14. Each ultrasonic sensor unit 18-21 comprises a transmitter 40 and a receiver 42. The transmitter 40 provides an ultrasonic signal to the corresponding receiver 42, wherein the ultrasonic signal is orthogonal to the direction of the fluid flow 12. While this embodiment of the present clamp-on ultrasonic meter 10 is described, one will appreciate that the present invention is applicable to the other embodiments described and taught in U.S. patent application Ser. No. 10/756,977, including embodiments in non-orthogonal ultrasonic signals, pitch and catch configurations, pulse echo configurations, and combined transmitter/receiver ultrasonic sensors, as shown respectively in FIGS. 3-6.

The signals $S_1(t)$-$S_N(t)$ received from each ultrasonic sensor unit 18-21 are processed by an ultrasonic signal processor 37 and a signal processor 24 (having FFTs 30-33 and an array processor 36) for determining the velocity of the fluid flow and/or volumetric flow rate of the fluid flow. One should appreciate that the present invention is applicable to at least all the configurations of an ultrasonic flow meter considered hereinbefore.

Multiple techniques may be used to process the transmitted ultrasonic signals in order to provide the flow rate of the fluid flow 12. For example, the time it takes for the ultrasonic signal to arrive at the receiver 42 for each sensor unit 18-21 is calculated and fed to signal processing algorithms (in the array processor 36) where the flow rate is calculated. Alternatively, the characteristics of each of the signals $S_1(t)$-$S_N(t)$ received from each ultrasonic sensor unit 18-21 are processed by an ultrasonic signal processor 37 and a signal processor 24 and compared in a cross-correlation algorithm or Sonar algorithm to provide the volumetric flow rate or fluid velocity. This algorithm works well when a good signal-to-noise ratio is observed at the receiver. When bubbles or particles intersect the signal path between the transmitter and receiver, however, significant attenuation can occur that can result in severe degradation of the received signal quality. The amount of attenuation will vary depending on the bubble and particle characteristics such as size and density.

Figure 7:
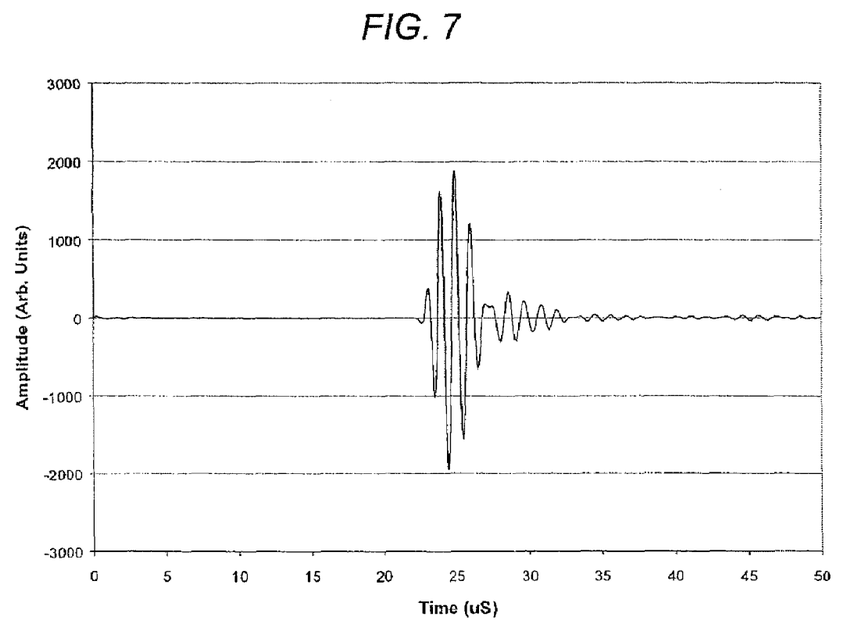
FIG. 7 is a graphic representation of amplitude versus time, showing a 1 MHz ultrasonic pulse.
Figure 8:
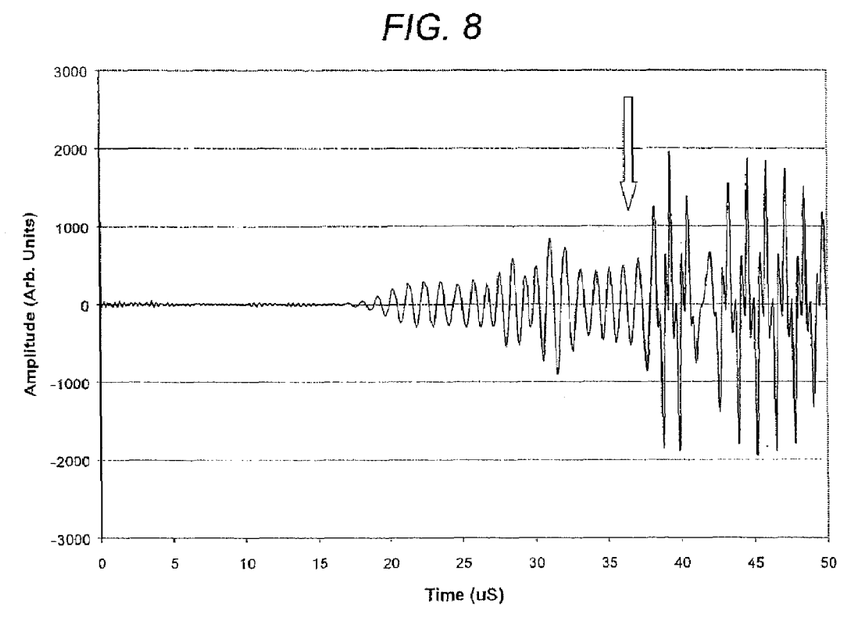
FIG. 8 is a graphic representation of amplitude versus time, showing an ultrasonic pulse with an undesirable 'ring-around' secondary signal.

The transmitting ultrasonic transducer array is periodically pulsed to create the ultrasonic signal that bisects the pipe. Each transducer will have a fundamental oscillation frequency, which when pulsed will emit a short ultrasonic burst signal. FIG. 7 diagrammatically shows an ultrasonic signal created by a 1 MHz ultrasonic transducer when pulsed with a 10 nS width pulse created in the flow meter 10. In typical applications the receiving ultrasonic receiver 42, located on the opposite side of a pipe 14, will receive this signal once it has bisected the pipe. In addition to the primary through-transmitted signal, however, other unwanted secondary signals will also be detected. As indicated above, secondary signals include portions of the original signal that have been refracted or reflected along a different path through the pipe than the preferred direct bisection. FIG. 8 shows an example of a received ultrasonic signal along with an unwanted 'ring-around' secondary signal. The arrow in FIG. 8 indicates the location of the through-transmitted pulse in relation to the large 'ring-around' signal. Contrast this to the clean ultrasonic signal seen in FIG. 7.

The quality of any flow measurement, independent of the technology, is dependent upon the signal-to-noise ratio. Noise, in this case, may be defined as any portion of the measured signal that contains no flow information. It is desirable to maximize the signal-to-noise ratio to obtain optimum sensor performance. This can be done by decreasing the attenuation of the transmitted ultrasonic signal.

Through-transmitted ultrasonic signals emitted by the transmitters 40 may be viewed as a "beam". The ultrasonic signal beam may be shaped and redirected by using materials with desirable impedances disposed within the acoustic path. The material or "lens" within the path of the ultrasonic signal effectively changes the focal point of the ultrasonic signal, thereby changing the beam shape of the ultrasonic signal. For example, a convergent beam that comes to a focus point inside the pipe or at the location of the receiver could potentially be blocked by a small obstruction, such as a bubble or particle, whereas a collimated or divergently shaped beam would not be as likely to be blocked. In a cross correlation algorithm, it may be desirable to utilize a convergent focused beam (where the beam is focused at or near the receiver 42) such that the bubbles or particles passing by the pairs of ultrasonic transmitters and receivers may be correlated. In this type of cross-correlation application, it may be desirable to tailor the beam so the maximum power is placed on the receiver sensor 42 where the obstructions, such as bubbles and particles, can modulate the beam amplitude. Alternatively, in a transit time configuration, it may be desirable to provide a beam having a distant or infinite focal point such that the beam is collimated or divergent within the pipe. In this case, only a portion of the beam may be blocked by any one bubble or particle. In general, it may be desirable to vary the statistic of the beam modulation; i.e., vary the amount of the flow captured by the beam, and therefore statistically how much of the entrained bubbles, particles, or other aspect of the flow is exposed to the beam. Varying the beam shape is one way to accomplish this.

Figure 9:
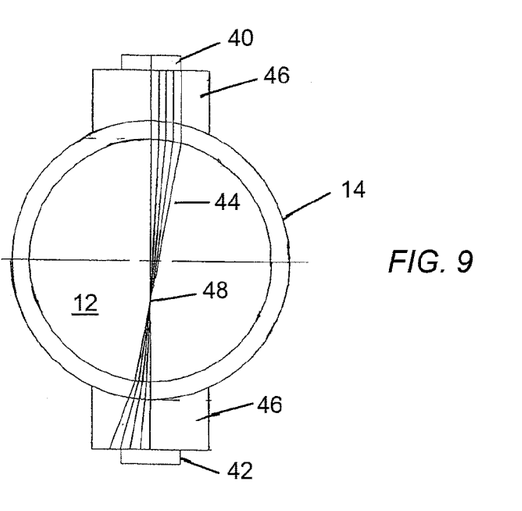
FIG. 9 is a cross sectional view of a pipe and ultrasonic sensor showing the ultrasonic beams using a metal shoe, in accordance with the present invention.
Figure 10:
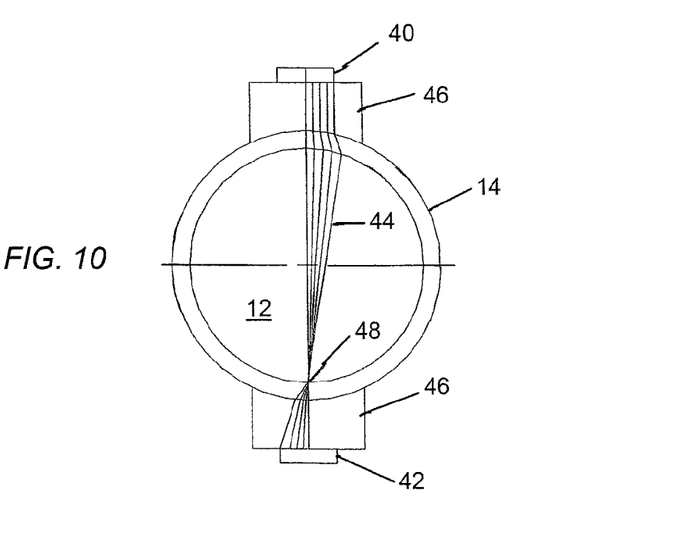
FIG. 10 is a cross sectional view of a pipe and ultrasonic sensor showing the ultrasonic beams using a plastic shoe, in accordance with the present invention.
Figure 11:
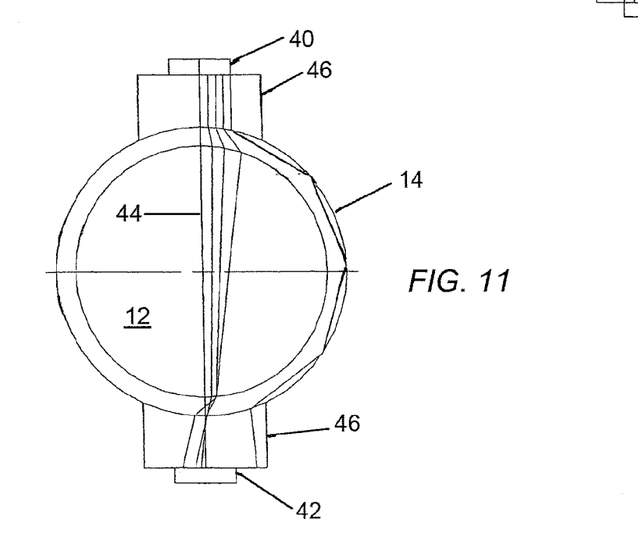
FIG. 11 is a cross sectional view of a pipe and ultrasonic sensor showing the ultrasonic beams using an RTV shoe, in accordance with the present invention.

A ray trace analysis was conducted to better understand the lensing impact of the curved interfaces traversed by the acoustic beam; i.e., curved interfaces like those encountered by signals emitted from an ultrasonic sensor externally mounted on a pipe. The results of this study showed the potential to improve the signal robustness to accommodate entrained air and/or particulates within the flow stream. For example, FIG. 9 diagrammatically illustrates an ultrasonic signal beam path 44 created by using a metal shoe or lens 46 as the interface between the pipe 14 and the transmitter sensor 40. The metal shoe has a sound speed of about 5850 m/s and a density of about 7800 kg/m$^3$. In this configuration the acoustic beam 44 is focused at a point located near to the transmitter sensor 40, and potentially within the process flow 12. FIG. 10 diagrammatically illustrates an ultrasonic signal beam 44 created by using a plastic lens 46 as an interface between the pipe 14 and transmitter sensor 40. The plastic shoe has a sound speed of about 2400 m/sec and a density of about 1200 kg/m$^3$. In this case, the focal point 48 of the ultrasonic beam 44 shifts to the wall of the pipe 14 opposite the wall where the transmitter sensor 40 is mounted. In a transit time application, this configuration would be susceptible to bubbles and contaminants. However, as discussed above, for a cross correlation application, this configuration may be desirable. FIG. 11 diagrammatically illustrates an ultrasonic signal beam 44 created by using a lens 46 comprising a low sound speed material such as an RTV polymer as an interface between the pipe 14 and transmitter sensor 40. The RTV polymer has a sound speed of about 1300 m/s and a density of about 1200 kg/m$^3$ (water has a sound speed of about 1480 m/s). The elimination of the ultrasonic beam focus within the fluid flow 12 by improved collimation improves the signal robustness in the presence of entrained air and particulate flow; e.g., the more collimated beam 44 does not narrow to a focal point within the flow, which focal point could coincide with a bubble or a particle traveling within the flow for a period of time thereby potentially causing a loss of signal. The broader signal beam 44 is less apt to be completely blocked.

Although an RTV polymer is an example of an acceptable lens material, the present invention contemplates that the lens 46 may comprise any material having a sound speed that provides the desired focal point of the ultrasonic beam, and therefore the desired ultrasonic beam shape. In addition, the present invention contemplates that one or more materials may be used to form the lens 46 to thereby provide the desired focal point and corresponding beam shape. Additionally, the shape of the lens material may be varied to provide the desired focal point and corresponding beam shape. The invention also contemplates that other methods known in the art and in the field of optics to collimate, converge or diverge the ultrasonic signal may be used.

As indicated above, the quality of any flow measurement, independent of the technology, is dependent upon the signal-to-noise ratio. The present invention of focusing the signal beam improves the signal-to-noise ratio by decreasing the amount of through transmitted signal attenuation, thereby increasing the amount of desirable signal relative to the level of noise present in the system; i.e., the signal-to-noise ratio.

It should be understood that any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention. It is to be understood that the above-described arrangements are only illustrative of the application of the principles of the present invention. Numerous other modifications and alternative arrangements may be devised by those skilled in the art without departing from the spirit and scope of the present invention, and the appended claims are intended to cover such modifications and arrangements.

What is claimed is:

1. An ultrasonic signal sensing apparatus for sensing flow within a cylindrical pipe having an internal passage, comprising:

at least one ultrasonic signal transmitter attached to a first wall section of the pipe, the transmitter operable to transmit ultrasonic signals into the pipe;

at least one ultrasonic signal receiver attached to a second wall portion of the pipe and aligned to receive transmitted ultrasonic signals; and a lens disposed on an exterior surface of the first wall section, between the first wall section of the pipe and the transmitter, aligned with the transmitter such that ultrasonic signals transmitted by the transmitter must pass through the lens and material of the first wall section prior to entering the internal passage of the pipe, which lens creates a signal beam having a focal point such that the signal beam is either collimated, divergent or convergent within the pipe.

2. The apparatus of claim 1, wherein the lens is made from a single material having a speed of sound, which material is operable to focus the transmitted ultrasonic signals to the focal point.

3. The apparatus of claim 1, wherein the lens is made from more than one material, each material having a speed of sound, which materials are operable to focus the transmitted ultrasonic signals to the focal point.

4. The apparatus of claim 1, wherein the focal point is distant from the transmitter such that the signal beam is collimated within the pipe.

5. The apparatus of claim 1, wherein the focal point is located at or near the location of the ultrasonic signal receiver.

6. An ultrasonic sensing device for sensing flow within a pipe, the apparatus comprising:

at least one sensor mounted to the pipe, the sensor having a transmitter mounted on a first wall portion of the pipe for transmitting an ultrasonic signal into the pipe and a receiver mounted on a second wall portion of the pipe for receiving the transmitted ultrasonic signal; and a lens disposed on an exterior surface of the first wall section, between the transmitter and the first wall portion of the pipe, such that ultrasonic signals transmitted by the transmitter pass through the lens and material of the first wall section prior to entering the internal passage of the pipe, which lens is operable to shape the transmitted ultrasonic signal into a beam having a focal point such that the signal beam is either collimated, divergent or convergent within the pipe.

7. The apparatus of claim 6, wherein the focal point is distant from the transmitter such that the signal beam is collimated within the pipe.

8. The apparatus of claim 6, wherein the focal point is located at or near the location of the ultrasonic signal receiver.

9. The apparatus of claim 6, wherein the lens is made from a single material having a speed of sound, which material is operable to focus the transmitted ultrasonic signal to the focal point.

10. The apparatus of claim 6, wherein the lens is made from more than one material, each material having a speed of sound, which materials are operable to focus the transmitted ultrasonic signals to the focal point.

11. A method for sensing flow within a pipe having an internal passage disposed between a first wall portion and a second wall portion, comprising the steps of:

providing a flow meter having at least one ultrasonic sensor unit that includes an ultrasonic transmitter attached to the first wall portion and an ultrasonic receiver attached to the second wall portion and aligned to receive ultrasonic signals transmitted from the transmitter;

providing a lens disposed on an exterior surface of the first wall section, between the transmitter and the first wall portion of the pipe;

selectively operating the ultrasonic transmitter to transmit a beam of ultrasonic signal through the lens and material of the first wall of the pipe prior to entering the internal passage of the pipe, which beam has a focal point such that the beam is either collimated, divergent or convergent within the pipe; and receiving the ultrasonic signals within the beam using the ultrasonic receiver.

12. The method of claim 11, wherein the ultrasonic transmitters are selectively operated to transmit a beam having a focal point that is distant from the transmitter such that the beam is collimated within the pipe.

13. The apparatus of claim 11, wherein the ultrasonic transmitters are selectively operated to transmit a beam having a focal point that is located at or near the location of the ultrasonic signal receiver.

\* \* \* \* \*